United States Patent [19]

Bagrodia et al.

[11] Patent Number: 5,276,111

[45] Date of Patent: Jan. 4, 1994

[54] BLENDS OF COPOLY(ARYLENE SULFIDE) AND POLY(ARYL SULFONE)

[75] Inventors: Shriram Bagrodia; David R. Fagerburg; Joseph J. Watkins; Paul B. Lawrence, all of Kingsport, Tenn.

[73] Assignee: Eastman Kodak Company, Rochester, N.Y.

[21] Appl. No.: 10,945

[22] Filed: Jan. 29, 1993

Related U.S. Application Data

[63] Continuation-in-part of Ser. No. 753,535, Sep. 3, 1991, abandoned.

[51] Int. Cl.$^5$ ............... C08L 81/06; C08L 81/04
[52] U.S. Cl. ............................. 525/537; 525/535
[58] Field of Search ..................... 525/537, 535

[56] References Cited

U.S. PATENT DOCUMENTS

| | | |
|---|---|---|
| 2,513,188 | 6/1950 | Macallum . |
| 2,538,941 | 1/1951 | Macallum . |
| 3,354,129 | 11/1967 | Edmonds, Jr. et al. . |
| 4,021,596 | 5/1977 | Bailey . |
| 4,528,335 | 7/1985 | Selby et al. . |
| 4,786,713 | 11/1988 | Rule et al. . |
| 4,792,600 | 12/1988 | Rule et al. . |
| 4,855,393 | 8/1989 | Rule et al. . |
| 5,049,446 | 9/1991 | Blackwell et al. ............ 525/537 |
| 5,102,947 | 4/1992 | Kawabata et al. ............ 524/609 |
| 5,155,176 | 10/1992 | Bagrodia et al. ............ 525/420 |

FOREIGN PATENT DOCUMENTS 0333406 9/1989 European Pat. Off. .
0170065 12/1989 European Pat. Off. .

*Primary Examiner*—Melvyn I. Marquis
*Assistant Examiner*—Helen F. Lee
*Attorney, Agent, or Firm*—Charles R. Martin; William P. Heath, Jr.

[57] ABSTRACT

Disclosed is a composition comprising an admixture of
(A) from 99 to 1 weight percent, based on the weight of the admixture, of a copoly(arylene sulfide) and
(B) from 1 to 99 weight percent, based on the weight of the admixture, of a poly(aryl sulfone).

2 Claims, No Drawings

BLENDS OF COPOLY(ARYLENE SULFIDE) AND POLY(ARYL SULFONE)

This application is a continuation-in-part of Ser. No. 07/753,535 filed Sep. 3, 1991, now abandoned.

This invention relates to blends of a copoly(arylene sulfide) and a poly(aryl sulfone).

Poly(arylene sulfide) resins are thermoplastic polymeric materials with good thermal stability, unusual insolubility, resistance to chemical environments and inherent flame resistance. Poly(arylene sulfide) resins additionally have good electrical insulative properties which make them ideal for electrical and electronic applications. Their excellent resistance to chemical degradation makes them ideal for use in chemical environments which involve organic solvents and strong mineral acids, such as coatings for pipes, tanks, pumps and other equipment. These polymers can be prepared by reacting p-dichloro-benzene with sodium sulfide in a polar organic solvent to produce poly(phenylene sulfide) and the by-product sodium chloride in accordance with U.S. Pat. No. 2,513,188 and U.S. Pat. No. 2,538,941. An improvement on this procedure involves adding N-haloamides as catalysts.

Recently copoly(arylene sulfides) have been discovered. These polymers can be described as having repeating units corresponding to the structure

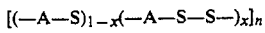

wherein x is in the range of 0.5 to 0.001, A is a divalent aromatic radical and n is at least 200 and is preferably in the range of 500 to 5,000.

It has now been discovered that copoly(arylene sulfide) can be blended with poly(aryl sulfone). This blend can be broadly described as an admixture of (A) from 99 to 1 weight percent, based on the weight of the admixture, of a copoly(arylene sulfide) corresponding to the structure

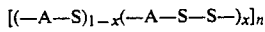

wherein A is a divalent substituted or unsubstituted aromatic radical, x is in the range of 0.5 to 0.001 and n is at least 25, and (B) from 1 to 99 weight percent, based on the weight of the admixture, of a poly(arylsulfone).

Blends of poly(phenylene sulfide) and poly(aryl sulfone) are disclosed in U.S. Pat. No. 4,021,596.

The copoly(arylene sulfide) polymers useful in this invention are identical to the copoly(arylene sulfide) polymers disclosed in U.S. Pat. No. 4,786,713 and U.S. Pat. No. 4,855,393, herein incorporated by reference, except that the minimum value of n of the copoly(arylene sulfide) polymers useful in this invention is lower than the minimum value of n for the copoly(arylene sulfide) polymers which is disclosed in these references. The copoly(arylene sulfide) polymers useful in this invention are therefore inherent in the disclosure of these references because as the molecular weight builds up toward the minimum value of n of at least 200 which is disclosed in these references the molecular weight passes through a molecular weight associated with the lower minimum value of n of 25 of the copoly(arylene sulfide) polymers of this invention. The copoly(arylene sulfide) polymers useful in this invention can be prepared by those skilled in the art by following the teachings of these references and controlling the stoichiometry, time, temperature and other variables of the reaction to achieve a molecular weight associated with a value of n which is at least 25.

The diiodoaromatic compounds which can be utilized to prepare the copoly(arylene sulfide) useful in this invention, include unsubstituted or substituted aromatics which have two iodine substituents. Preferred diiodoaromatic compounds are the diiodobenzenes, diiodonaphthalenes and diiodobiphenyls which may be unsubstituted or substituted. More preferably the diiodoaromatic compounds suitable for the present invention include p-diiodobenzene, m-diiodobenzene, p,p'-diiodobiphenyl, p,p'-diiodobiphenyl, p,p'-diiododiphenyl ether and 2,6-diiodonaphthalene. Most preferably the diiodo compound is p-diiodobenzene.

The poly(aryl sulfone) polymers useful in this invention and the method of their preparation are well known in the art and are described in U.S. Pat. No. 4,021,596 and European Patent Application 0 170 065.

In one preferred embodiment of this invention the poly(aryl sulfone) corresponds to the structure

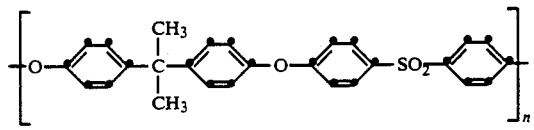

where n is at least 15.

In another preferred embodiment of this invention the poly(aryl sulfone) corresponds to the structure

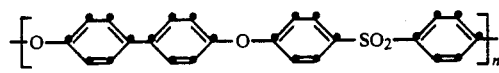

where n is at least 15.

In still another preferred embodiment of this invention the poly(aryl sulfone) corresponds to the structure

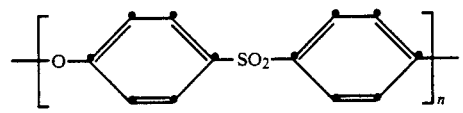

where n is at least 25.

In an optional embodiment of this invention the composition can further contain from 0.1 to 25 weight percent, based on the combined weight of the copoly(arylene sulfide) and poly(aryl sulfone), of a poly(cophenylene sulfide phenylene sulfone) corresponding to the structure

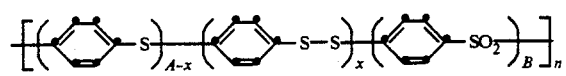

wherein A is in the range of 0.95 to 0.05, B is in the range of 0.05 to 0.95 and x is in the range of 0.001 to 0.5 and n is at least 25.

The poly(cophenylene sulfide phenylene sulfone) is known in the art and can be prepared in accordance the disclosure of U.S. Pat. No. 4,786,713 using a diiodo sulfone as a starting material.

The blends of this invention can be prepared by known techniques for blending polymers. For example, the polymers can be coextruded in convention twin screw extrusion equipment. Also, powders of both polymers may be admixed and the admixed powders extruded in a single screw extruder. Preferably, an admixture of powdered polymer is prepared and the admixture powder is extruded in a single screw extruder.

The amount of copoly(arylene sulfide) is in the range of 99 to 1 weight percent, preferably 85 to 15 weight percent, based on the weight of the admixture. The amount of poly(aryl sulfone) is in the range of 1 to 99 weight percent, preferably 15 to 85 weight percent, based on the weight of the admixture.

The compositions of this invention can be used for preparation of various shaped articles such as pellets, fibers and molded articles. The polymer can be prepared into these shaped articles by conventional processes, such as injection molding, melt spinning, and melt extrusion.

The compositions of this invention can additionally contain fillers, nucleating agents and reinforcing materials in the form of fibers, minerals, powders or mats. For example, the compositions can contain glass fibers, aluminum oxide, calcium oxide, silicon dioxide, Titanium dioxide, copper, kaolin, and the like.

The compositions of this invention are normally solid in the sense that at typical room temperatures and pressures the compositions are in a solid state as compared to a liquid state. The solid character of the composition results from both polymers having a sufficiently high molecular weight to be a solid.

The blends of this invention are characterized by extremely desirable interfacial adhesion between the copoly(phenylene sulfide) and poly(aryl sulfone). Interfaced adhesion is an important property of a blend of two polymers because it governs the strength of the blended material. When the interfacial adhesion is high, the blends can withstand higher stress before failure for any given morphology.

The compositions of this invention also exhibit enhanced mold shrinkage compared to compositions of the prior art. The mold shrinkage of a polymer is a very significant aspect of the commercial acceptability of a polymeric composition for molding applications. In order for a polymer to be commercially acceptable, an article molded from the polymer must retain its shape during the period of time the article is cooling after being molded. The failure of an article to retain its shape during cooling is generally referred to as warpage. The failure of an article to retain its shape through warpage is a result of the polymer shrinking during the cooling. Thus, the less a polymer shrinks during cooling the less warpage will occur and the better an article will retain its original shape. The compositions of this invention contain enhanced mold shrinkage in the sense that the mold shrinkage of the compositions of this invention are significantly less that the mold shrinkage of similar compositions known in the prior art.

Polymeric compositions can be tested for mold shrinkage by molding flexural bars and determining the length of the bar. The length is then compared to the theoretical length of the mold cavity and the mold shrinkage is calculated as a percentage value as follows:

$$\text{mold shrinkage} = 100 \cdot \frac{(\text{length of mold cavity} - \text{length of bar})}{\text{length of mold cavity}}$$

EXAMPLE 1

This example illustrates the enhanced interfacial adhesion associated with the blends of this invention.

A copoly(phenylene sulfide) was prepared by the melt phase reaction of sulfur and p-di-iodobenzene, as described in U.S. Pat. Nos. 4,786,713 and 4,792,600. The value of x was estimated to be about 0.10 as determined by elemental analysis. The melt viscosity of copoly(phenylene sulfide) at 300° C. at 25 Sec$^{-1}$ shear rate was about 5000 poise. Properties of the product included a melt viscosity of about 5000 poise at 300° C. and 25 rad/sec, a glass transition temperature of 89° C. and an estimated disulfide content of 10 mol %.

A blend was prepared which contained 50 weight % of the copoly(phenylene sulfide) in powdered form and 50 weight % of a powdered poly(aryl sulfone) corresponding to the following structure

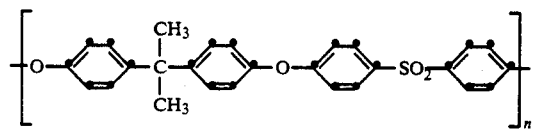

where n is at least 20.

The blend Was dried for 12 hours at 120° C. in a Vacuum oven. The dried blend was melt blended in an extruder at 330° C. The melt blend was coarsely ground to less than 3 mm particle size and compression molded films were prepared at 300° C.

The film was cryogenically fractured in liquid nitrogen and the fracture surface morphology was determined using a scanning electron microscope. A scanning electron micrograph of the cryogenically fractured surface clearly shows good interfacial adhesion between the two phases.

EXAMPLE 2

This example illustrates the poor interfacial adhesion associated with blends of poly(phenylene sulfide) and poly(aryl sulfone).

Example 1 was repeated except that a commercially available poly(phenylene sulfide) was used in place of the copoly(phenylene sulfide). The poly(phenylene sulfide) had a melt shear viscosity of about 11,740 poise at 300° C. and 25 sec$^{-1}$ shear rate.

A scanning electron micrograph of the fractured surface clearly indicates very poor interfacial adhesion between the two phases.

EXAMPLE 3

This example illustrates the enhanced interfacial adhesion associated with the blends of this invention.

Example 1 was repeated except that the amount of poly(aryl sulfone) was 10% and the amount of copoly(phenylene sulfide) was 90%.

A scanning electron micrograph of the fractured surface clearly indicates very poor interfacial adhesion between the two phases.

EXAMPLE 4

This example illustrates the enhanced interfacial adhesion associated with the blends of this invention.

A three component composition was prepared containing a poly(aryl sulfone), a copoly(phenylene sulfide) and a poly(cophenylene sulfide phenylene sulfone) corresponding to the following structure

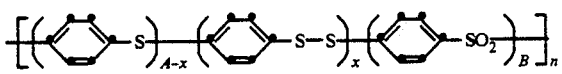

wherein A is in the range of 0.95 to 0.05, B is in the range of 0.05 to 0.95 and x is in the range of 0.001 to 0.5 and n is at least 30.

The poly(cophenylene sulfide phenylene sulfone) was prepared in accordance with the disclosure of U.S. Pat. No. 4,786,713 using the following procedure. 19.5 g (0.61 moles) sulfur, 102.5 g (0.31 moles) 1,4-diiodobenzene, and 142.9 g (0.30 moles) p,p'-diiododiphenyl sulfone were introduced into a 500 Ml 3-neck round-bottom flask. The melt is stirred through the center neck via a vacuum adapter and stirrer seal, using a stainless steel stirrer shaft and blade. One side neck is fitted with a 350 mm (length) Vigreaux column topped with a vacuum-jacketed takeoff head with a thermal well inserted in the top. The column, head, and takeoff is wrapped with an electric heat tape and then fiberglass tape. The column set-up is heated to approximately 100° C. the column is connected to a 500 Ml 2-neck round-bottom blask which is cooled with dry ice for condensation of the volatiles. The other side neck is used as an air inlet. The air flow was maintained at 0.1 ft $^3$/h. The reaction is started at 200 torr and 230° C. for 1.25 h, then the temperature is increased to 240° C. for 0.5 h, then 250° C. for 1.75 h. The pressure is then decreased as follows: 175 torr for 0.25 h, 150 torr for 0.25 h, 125 torr for 0.25 h, 100 torr for 0.25 h, 60 torr for 0.25 h, and 30 torr for 0.25 h. Then the pressure is reduced to 0.5 torr via a vacuum pump for the remainder of the reaction. After one hour at 0.5 torr and 250° C., the temperature is raised to 300° C. for 1 h. The resulting copolymer was an amorphous, high viscosity material with a Tg of 147.5° C. by DSC.

The three polymers are prepared into the admixture following the procedure of Example 1.

A scanning electron micrograph of the cryogenically fractured surface clearly shows good interfacial adhesion between the two phases.

EXAMPLE 5

This example illustrates the enhanced mold shrinkage associated with blends of the invention comprised of copoly(phenylene sulfide) and poly(aryl sulfone).

A first composition was prepared which corresponded to the claimed composition. This composition was prepared by preparing a copoly(phenylene sulfide) in accordance with Example 1 of the patent application and the procedure disclosed in U.S. Pat. No. 4,786,713. An admixture of 70 weight parts of this polymer and 30 weight parts of the same poly(aryl sulfone) used in Example 1 was prepared by conventional extrusion. The blend also contained 30 weight percent glass fiber, based on the total weight of both polymers, which was added during extrusion. A second composition was prepared which was identical to the first composition except that a poly(phenylene sulfide) disclosed in U.S. Pat. No. 4,528,335 and U.S. Pat. No. 3,354,129 was used instead of the copoly(phenylene sulfide). The poly(phenylene sulfide) had a weight average molecular weight calculated from melt viscosity measurements of about 68,300 and the molecular weight of both the copoly(phenylene sulfide) and poly(phenylene sulfide) were comparable for purposes of measuring mold shrinkage.

Both compositions were tested for mold shrinkage by molding five flexural bars, measuring the final length of each of the bars and determining the average of the five final lengths. The average length is then compared to the theoretical length of 5.000 inches, which corresponds to the dimensions of the mold cavity, and the mold shrinkage is calculated as a percentage value as follows:

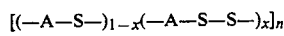

The mold shrinkage of the second composition, illustrating the prior art, was 0.18%. The mold shrinkage of the first composition, illustrating the claimed composition, was 0.07%. Thus, the mold shrinkage of the composition of the invention was more than 60 percent lower than the mold shrinkage of the composition of the prior art.

We claim:
1. A composition comprising an admixture of
   (A) from 99 to 1 weight percent, based on the weight of the admixture, of a copoly(phenylene sulfide) corresponding to the structure

$[(-A-S-)_{1-x}(-A-S-S-)_x]_n$ wherein A is a divalent phenylene radical, x is in the range of 0.5 to 0.001 and n is at least 25, and
   (B) from 1 to 99 weight percent, based on the weight of the admixture, of a poly(arylsulfone) corresponding to the structure

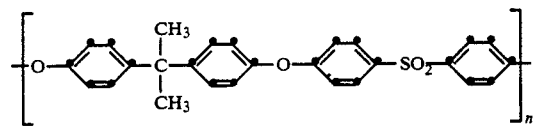

wherein n is at least 15.
2. The composition of claim 1 wherein the amount of component (A) is in the range of 85 to 15 weight percent and the amount of component (B) is in the range of 15 to 85 weight percent.